United States Patent
Dearborn et al.

(10) Patent No.: US 6,919,816 B2
(45) Date of Patent: Jul. 19, 2005

(54) SYSTEM AND METHOD FOR DISPLAYING COMPUTER SYSTEM STATUS INFORMATION

(75) Inventors: Timothy C. Dearborn, Austin, TX (US); Shawn P. Hoss, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 650 days.

(21) Appl. No.: 09/876,594

(22) Filed: Jun. 7, 2001

(65) Prior Publication Data

US 2002/0190868 A1 Dec. 19, 2002

(51) Int. Cl.$^7$ .............................. G08B 5/22; G09F 9/33
(52) U.S. Cl. ........................... 340/815.45; 340/815.65; 361/686; 312/223.5
(58) Field of Search ...................... 724/48; 714/48; 361/827, 828, 683, 685, 686, 687; 362/555; 340/815.45, 815.4, 815.65; 312/223.2, 223.5

(56) References Cited

U.S. PATENT DOCUMENTS

| | | | |
|---|---|---|---|
| 5,305,013 A | * | 4/1994 | Daniels ........................ 345/82 |
| D360,411 S | | 7/1995 | Sharp et al. ............... D14/115 |
| 5,519,832 A | | 5/1996 | Warchol ................ 395/183.22 |
| 5,644,707 A | * | 7/1997 | Chen ........................... 714/57 |
| 5,880,955 A | | 3/1999 | Matoba et al. ............... 364/188 |
| D411,178 S | | 6/1999 | Ikenaga ...................... D14/100 |
| D412,497 S | | 8/1999 | Lai ............................. D14/115 |
| 5,954,827 A | | 9/1999 | Frank et al. ................... 714/48 |
| D416,009 S | | 11/1999 | Lai ............................. D14/115 |
| 5,995,012 A | | 11/1999 | Lee et al. .............. 340/815.45 |
| 6,018,456 A | * | 1/2000 | Young et al. ............... 361/684 |
| D431,243 S | | 9/2000 | Oba .......................... D14/351 |
| D432,134 S | | 10/2000 | Leman ...................... D14/441 |
| D435,559 S | | 12/2000 | Tanaka ...................... D14/444 |
| D436,952 S | | 1/2001 | Goto ......................... D14/349 |
| D436,953 S | | 1/2001 | Matsuoka .................. D14/349 |
| D437,325 S | | 2/2001 | Searby et al. .............. D14/445 |
| D440,572 S | | 4/2001 | Jean et al. ................. D14/445 |
| 6,259,598 B1 | * | 7/2001 | Beaman et al. ............. 361/683 |
| 6,597,566 B1 | * | 7/2003 | Phan .......................... 361/683 |
| 6,717,802 B2 | * | 4/2004 | Sa et al. ..................... 361/683 |

* cited by examiner

*Primary Examiner*—Toan N. Pham
(74) *Attorney, Agent, or Firm*—Baker Botts L.L.P.

(57) ABSTRACT

A system and method for displaying status information from several devices in a computer system is disclosed. A primary status indicator is associated with a server or a group of servers. The primary status indicator is communicatively coupled to the server management software that is monitoring the server or server group. During the period that the server management software does not detect a failure or an imminent failure in any component of the server or server group, the primary status indicator will be illuminated to reflect a normal operating status. If the server management software detects a failure or an imminent failure in a component of the server or a server in the server group, the primary status indicator will be illuminated to reflect an alert status.

67 Claims, 9 Drawing Sheets

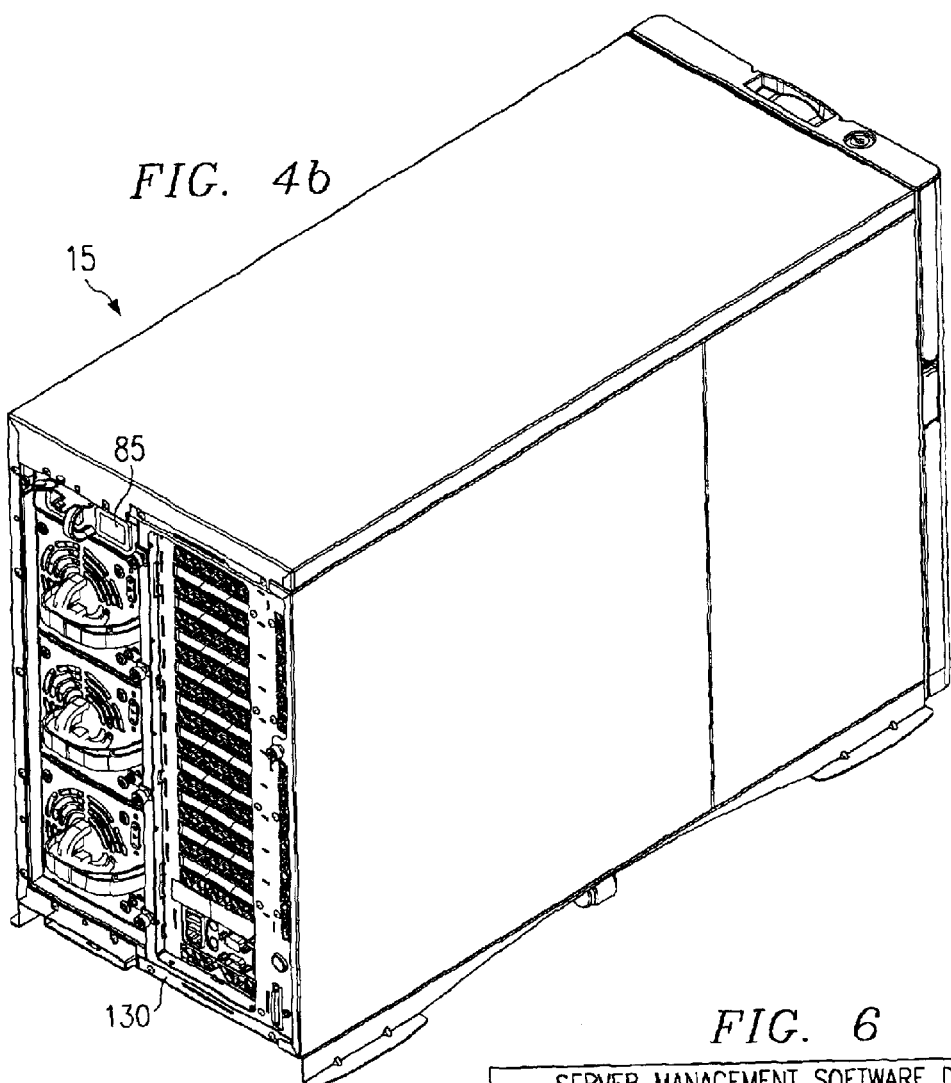
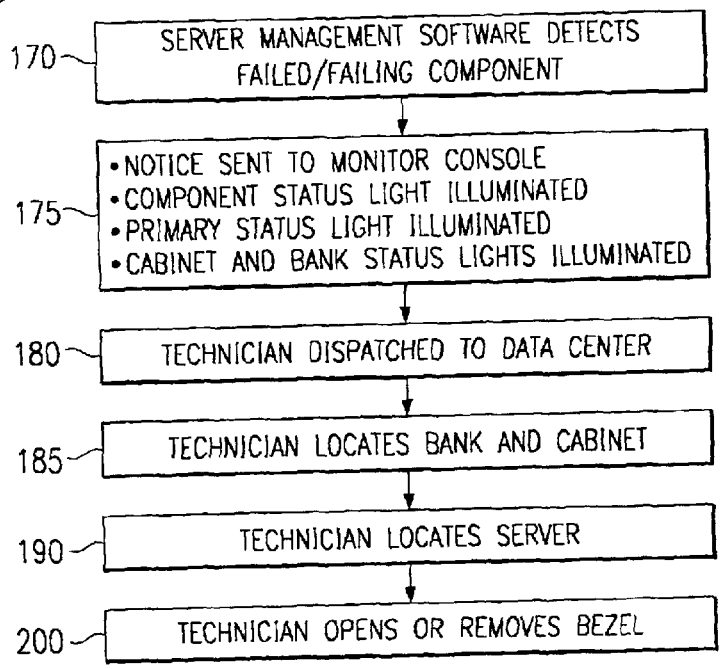

SYSTEM AND METHOD FOR DISPLAYING COMPUTER SYSTEM STATUS INFORMATION

CROSS-REFERENCE TO RELATED APPLICATION

This application is related to U.S. design patent application titled "Computer System Status Display" by Timothy C. Dearborn and Shawn P. Hoss, which was filed concurrently herewith as application Ser. No. 29/143,122, which has issued as U.S. Pat. No. D476,009, and which is incorporated herein by reference in its entirety for all purposes.

TECHNICAL FIELD

The present disclosure relates in general to the field of computer systems, and, more particularly, to a system and method for displaying status information.

BACKGROUND

A data center, also referred to as a server farm, typically includes a group of networked servers. The networked servers are housed together in a single location. A data center expedites computer network processing by combining the power of multiple servers and allows for load balancing by distributing the workload among the servers. More companies and other organizations are using data centers because of the efficiency of these centers in handling vast numbers of storage retrieval and data processing transactions. Depending on the nature and size of the operation, a data center may have thousands of servers. Typically, these servers are rack-mounted and placed in cabinets. Each cabinet may hold dozens of rack-mounted servers. These cabinets are generally organized into banks or aisles. Accordingly, a large data center may have several banks of cabinets that each contain several rack-mounted servers. All of these servers within the data center are typically monitored via a single console by one or two individuals who serve as network monitors.

Conventional data centers typically use server management software to monitor server components and alert system monitors in the event of a component failure. For example, if one of the hard drives of a server fails, then the server management software will send an alert message to the system monitor's console. The network monitor will respond to the alert message and rectify the failure. Because data centers are often implemented in mission critical operations that demand continuous and reliable operation, the servers of these data centers must operate continuously with very few failures. In the event of a server failure, the problem must be solved immediately. In this sort of environment, any down time is unacceptable. For example, if the data center of a financial firm goes down, a minute of down time can result in thousands of dollars of revenue in unexecuted stock transactions. Often, a failed or failing server component is the cause of the server failure. Examples of server components that may fail include hard drives, fans, and power supplies.

In the event of a system failure, the network monitors must dispatch a technician to the data center to find and replace the faulty component. Because the data center is used for a continuous or mission critical function, the technician must replace the faulty component as soon as possible. Each server typically includes several components that can be serviced by a user or technician. These components include fans, hard drives, motherboards, PCI cards, memory DIMMs, power supplies, cables, and CPUs, among other components. Each of these components may include one or more status lights that report the operational status of the component. A single component may include several status lights that report on the status of the device. The color of the status light, as well as whether the light is flashing or blinking, indicates whether the component is operating properly. For example, a green status light often indicates that the component is operating correctly. If the status light is a color other than green, or is flashing, then the device may be malfunctioning. Many components use a unique, if not complex, pattern of colored, blinking lights to communicate the status of the component.

As an example, a typical server hard drive contains several status lights. These hard drive status lights may correspond to power, disk activity, and an alarm indicator. Other server components may include more status lights than the typical hard drive. Because each server has several components, each server will have numerous status lights. For example, a typical server may contain eight hard drives, each of which includes three status lights. That same server may also include four power supplies, each containing three status lights. In addition, the server will typically include a dozen status lights on its front panel. This server will also typically include components that do not have status lights that are visible on the front panel. For example, the status lights for a fan unit are not visible until the chassis of server is opened. All told, a single server may include more than fifty individual status lights. A rack of servers may includes hundreds of individual status lights, and a single aisle within a data center may include thousands of individual status lights.

SUMMARY

In accordance with teachings of the present disclosure, a system and method for displaying status information from several devices in a computer system is disclosed that provides significant advantages over prior developed systems.

A primary status indicator is located on a bezel or panel of a server. The primary status indicator is communicatively coupled to the server management software that is monitoring the server. If the server management software does not detect a failure or an imminent failure in any component of the server, then the primary status indicator will be illuminated to reflect a normal operating status. If the server management software does detect a failure or an imminent failure in a component of the server, then the primary status indicator will be illuminated to reflect an alert status. In another embodiment of the present disclosure, the technician may then remove or open the bezel to reveal the front panel of the server. In another embodiment of the present disclosure, the front panel may also contain a status display that outputs text or graphics to identify the cause of an alert status.

In another embodiment of the presently disclosed system and method for displaying status information, a primary status indicator may be associated with a group of several servers, such as a cabinet or a bank of servers. If a primary status indicator is associated with a group of servers, then the primary status indicator will be illuminated to reflect a normal operating status if the server management software does not detect a failed or failing component in any of the servers in the group. If any of the components of any of the servers in the group of servers fails or is in danger of failing, then the primary status indicator will reflect an alert status.

A technical advantage of the present disclosure is that a single status indicator is initially presented to the technician.

The simple display allows a technician to quickly assess the status of several servers without examining the front panel of each server or all of the status lights of each server. If one of the servers has a failing component, this server can be quickly identified. Another advantage of the present disclosure is that it provides an unambiguous indication of the status of a server. A technician can quickly determine whether a server component has failed based on the color and/or position of the illumination of the primary status indicator. A further advantage of the present disclosure is that it allows for a uniform positioning of status information across all servers in a data center regardless of server configuration and manufacturer as each primary status indicator may be uniformly positioned on a bezel or panel. The centralized location of the primary status indicator also facilitates a fast assessment of server status. Another advantage of the present disclosure is that the primary status indicator may be used on servers with small or narrow front panels, because the primary status indicator is only a single indicator, and it may also incorporate a logo or mark that might otherwise take up limited space. Furthermore, because a corporate mark may be incorporated into the primary status indicator, positive name and trademark recognition may be reinforced during normal status conditions. The present disclosure also allows for a uniform design throughout the data center regardless of server configuration or manufacturer, which also reinforces name and trademark recognition. Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4b is a pictorial view of a server with a rear-mounted status display;

FIG. 6 is a flow chart of an embodiment of the method of the present disclosure.

DETAILED DESCRIPTION

The present detailed description discloses a primary status indicator that is located on a bezel that is mounted to cover the front panel of a server. The primary status indicator receives status information from the server management software that is monitoring the server. The primary status indicator will be illuminated to reflect a normal operating status during those periods that the server management software does not detect a failure or an imminent failure in any component of the server. If the server management software does detect a failure or an imminent failure in a component of the server, the primary status indicator will be illuminated to reflect an alert status.

Figure 1A:
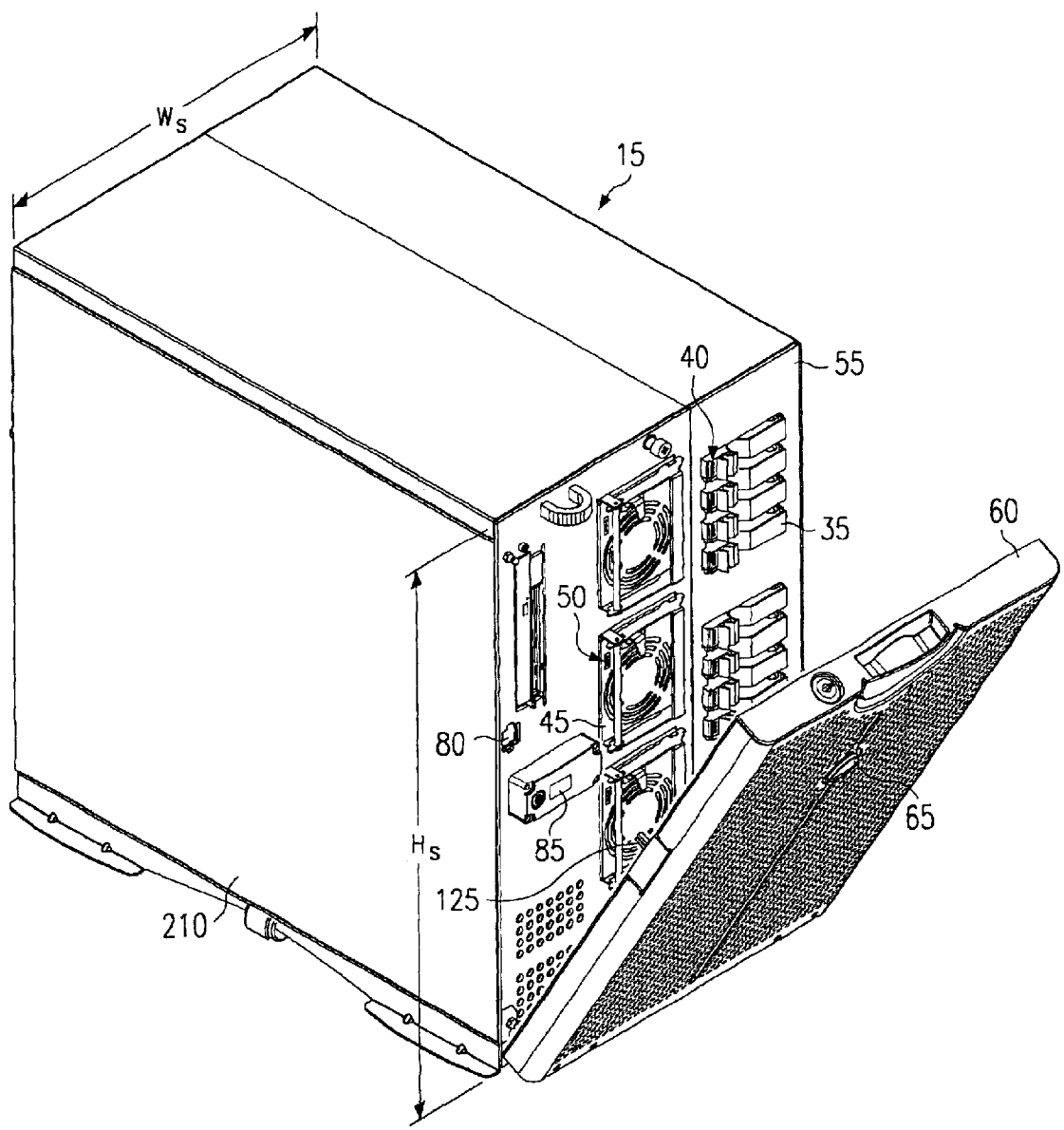
FIGS. 1a and 1b are pictorial views of a server having a partially opened bezel.
Figure 1B:
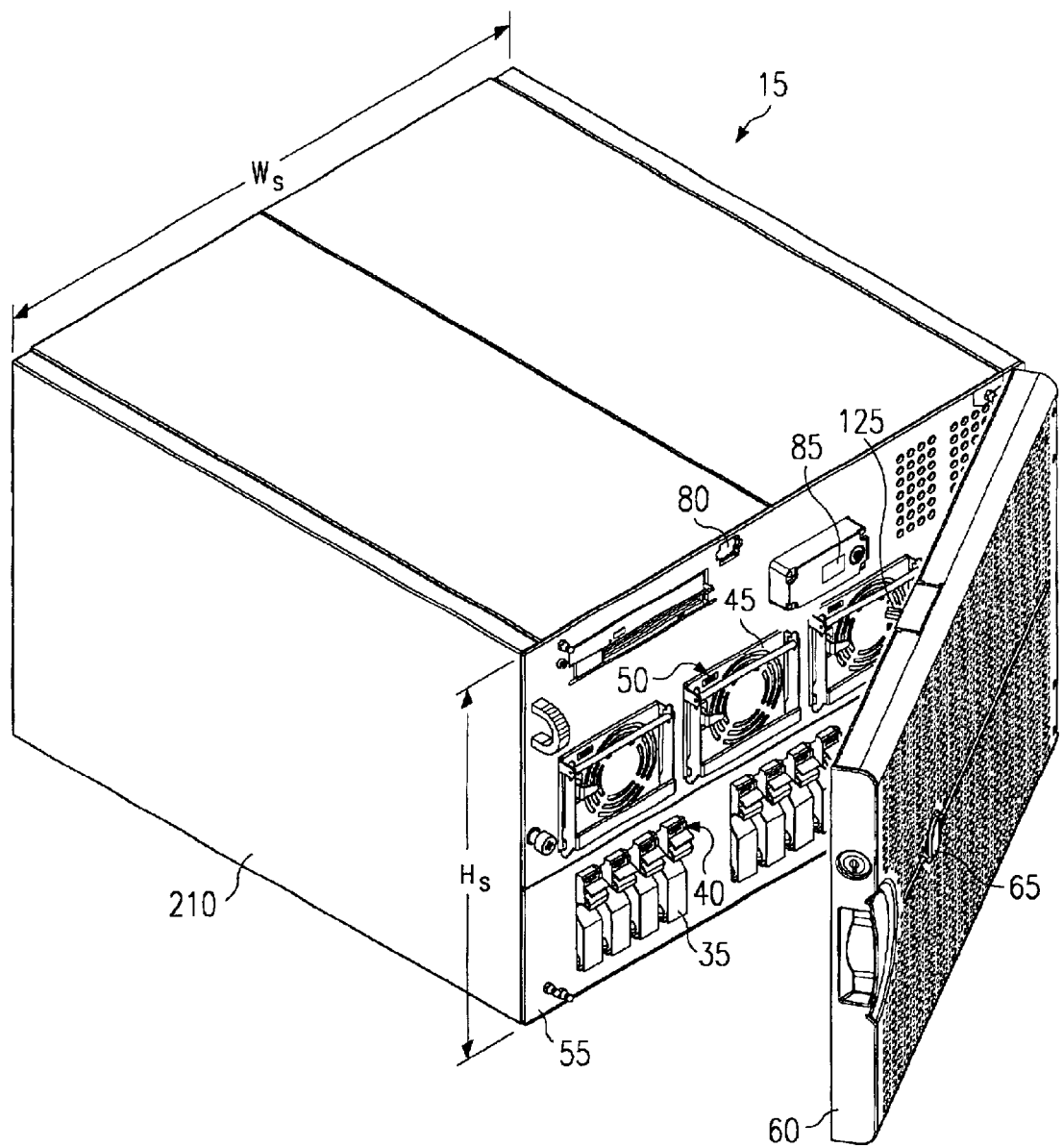
Figure 1C:
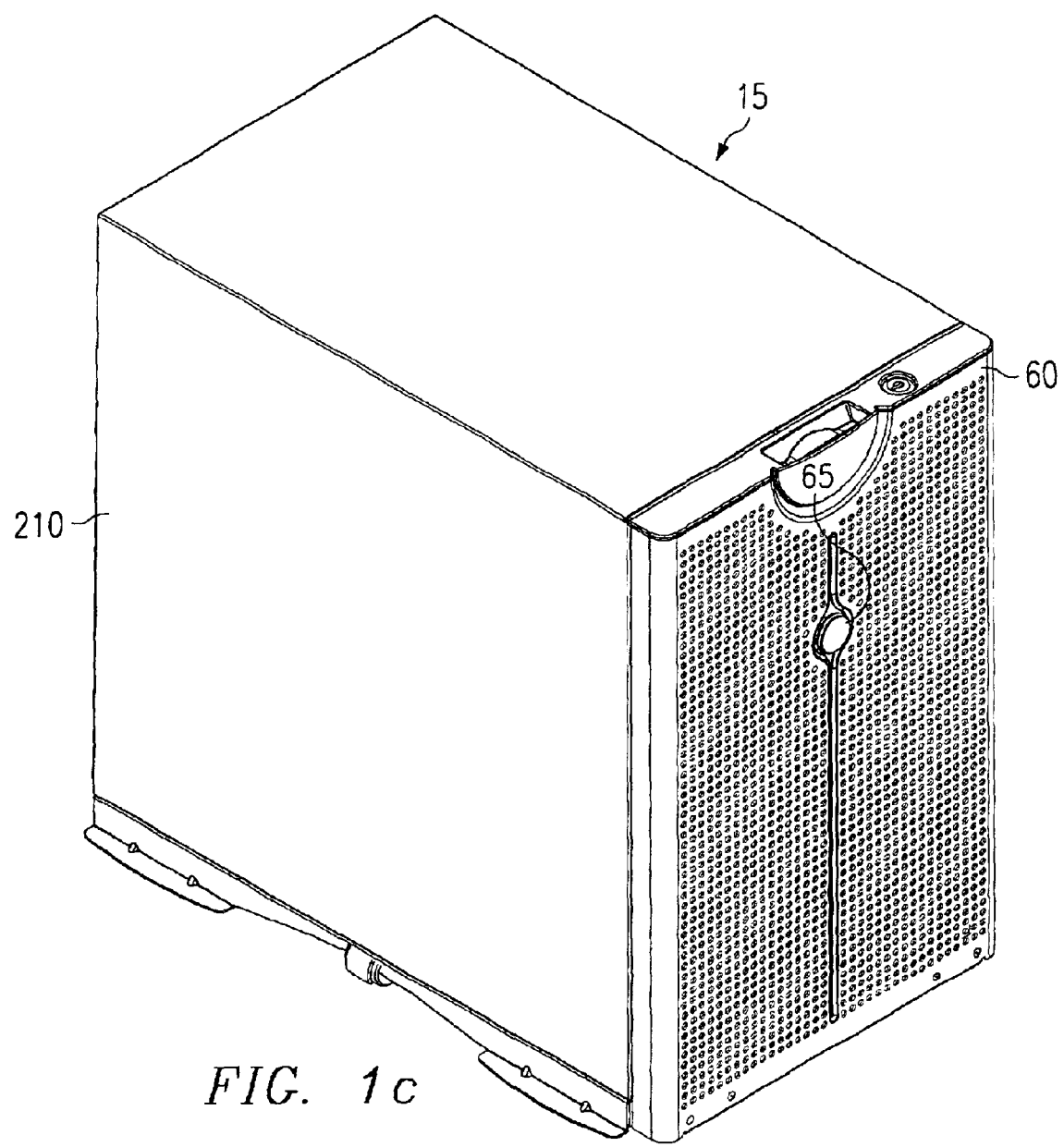
FIG. 1c is a pictorial view of a server with a closed bezel.

FIGS. 1a, 1b, and 1c illustrate an embodiment of the present disclosure. Shown in FIG. 1a is a computer system or server 15 in a tower configuration. Shown in FIG. 1b is a rack-mounted server 15. Server 15 may have several components, and each of which may have one or more status lights. For example, as shown in FIGS. 1a and 1b, server 15 contains eight hard drives 35 that each contain three status lights 40. Server 15 also contains four power supplies 45 that each contain three status lights 50. Accordingly, server 15 has several dozen status lights on the front panel 55 alone. The typical server 15 also has components that do not have status lights that are visible on the front panel 55. For example, the status lights for a fan unit are not visible until the chassis of server 15 is opened.

Bezel or panel 60 may be mounted to cover server front panel 55. Bezel 60 may be mounted on server front panel 55, or on the chassis or housing 210 for server 15, or any other suitable location. Bezel 60 is preferably sized to cover the entire server front panel 55 and to substantially match the dimensions of the server front panel 55 in terms of width and height. For example, the width $W_B$ of bezel 60 is preferably substantially equal to the width $W_S$ of server 15. Similarly, the height $H_B$ of bezel 60 is preferably substantially equal to the height $H_S$ of server 15. Bezel 60 is preferably substantially opaque to prevent any light transmission from the status lights on the server front panel 55 through bezel 60. Bezel 60 may be ventilated to allow cooling of the server front panel 55. Bezel 60 may be affixed on server front panel 55 by hinges 90 such that the bezel may be swung open to expose the server front panel 55. As depicted in FIGS. 1a and 1b, bezel 60 is not completely closed. FIG. 1c depicts the server 15 of FIG. 1b wherein the bezel 60 is closed. During normal operation of server 15, bezel 60 is preferably closed. Alternatively, bezel 60 may be mounted on server front panel 55 by rails such that bezel 60 may slide open to expose the server front panel 55. Alternatively, bezel 60 may be attached to server front panel 55 by sockets such that bezel 60 may be separated from the server 15 to expose the server front panel 55.

Figure 2A:
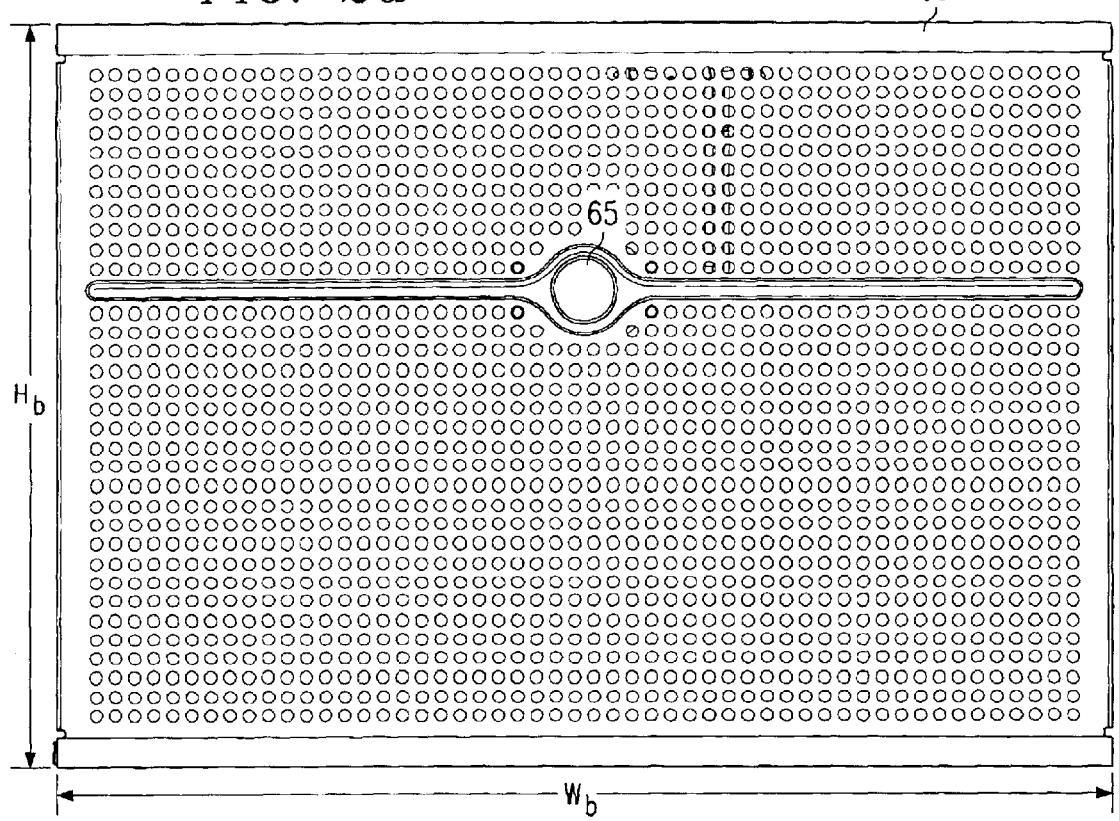
FIG. 2a is a front view of an embodiment of the bezel.
Figure 2B:
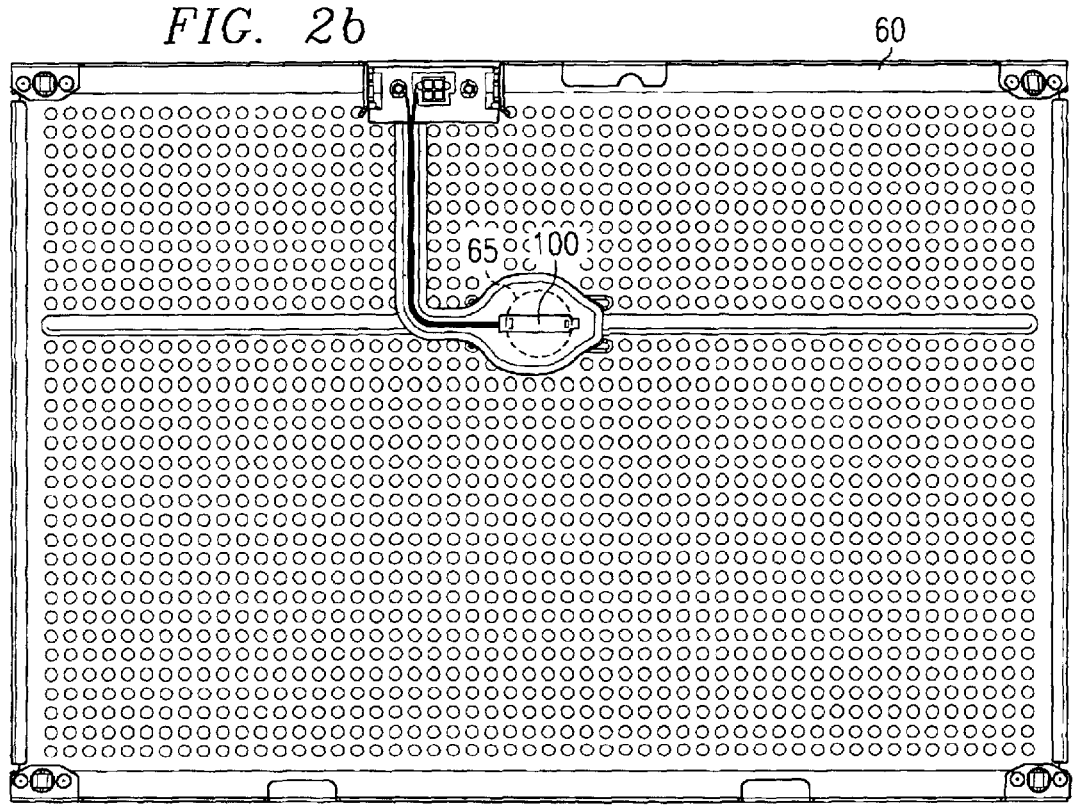
FIG. 2b is a back view of an embodiment of the bezel.

FIG. 2a is a front view of an embodiment of bezel 60. Primary status indicator 65 is mounted on the front surface of bezel 60. Primary status indicator 65 may be a badge or any other indicator. Primary status indicator 65 is preferably cycloptically positioned on the front surface of bezel 60 for maximum visibility. A cycloptically positioned primary status indicator 65 is mounted or positioned in a substantially central location on the front surface of bezel 60. Primary status indicator 65 preferably incorporates a corporate logo, such as the corporate logo of the manufacturer or distributor of server 15. FIG. 2b shows the backside of bezel 60 shown in FIG. 2a. Primary status indicator 65 contains at least one light source 100 such that primary status indicator 65 may be illuminated. The light source 100 may be any device that provides a uniform, dependable light source. For example, light source 100 may be an LED or LED light bar. Primary status indicator 65 illuminates in at least one distinctive color. If the primary status indicator 65 incorporates a corporate logo, the primary status indicator 65 may be illuminated in the color associated with that corporate logo. Primary status indicator 65 may also rotate such that primary status indicator 65 is level or in a fixed position regardless of the rotation of server 15. For example, if primary status indicator 65 incorporates a corporate logo, the logo will be right side up, regardless of whether server 15 is oriented horizontally or vertically.

Figure 2C:
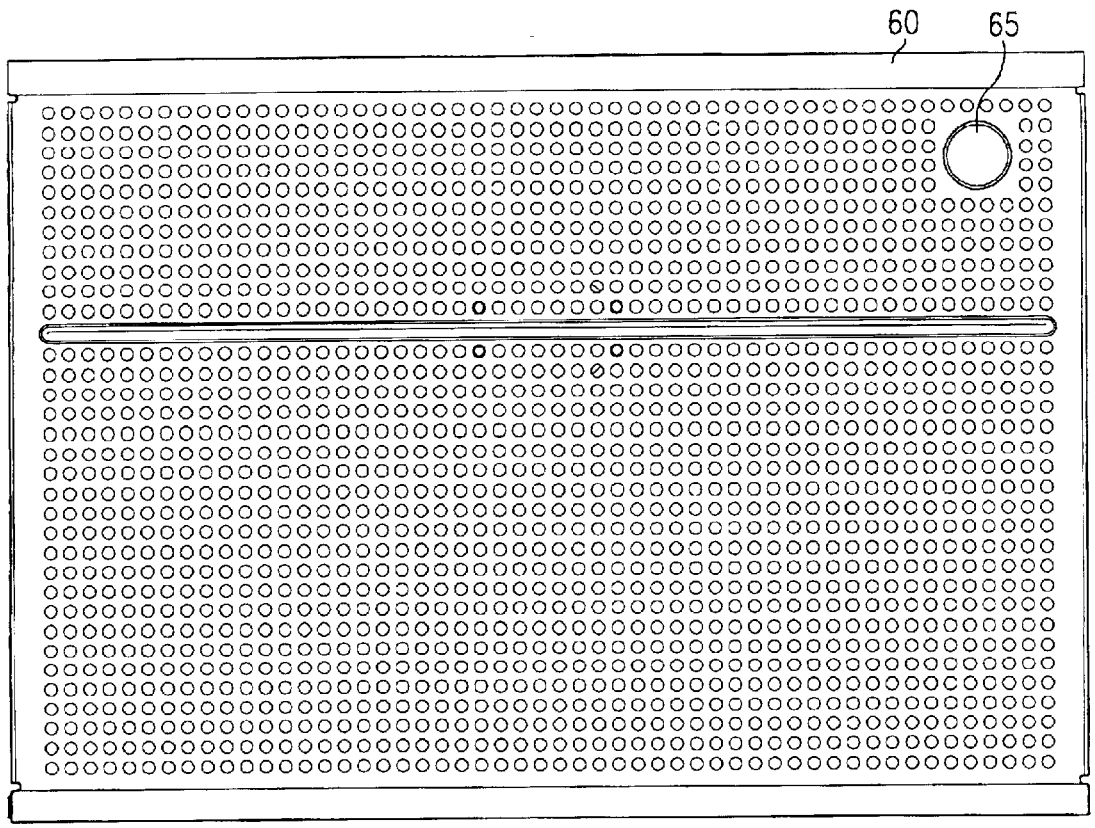
FIG. 2c is a front view of an embodiment of the bezel.
Figure 2D:
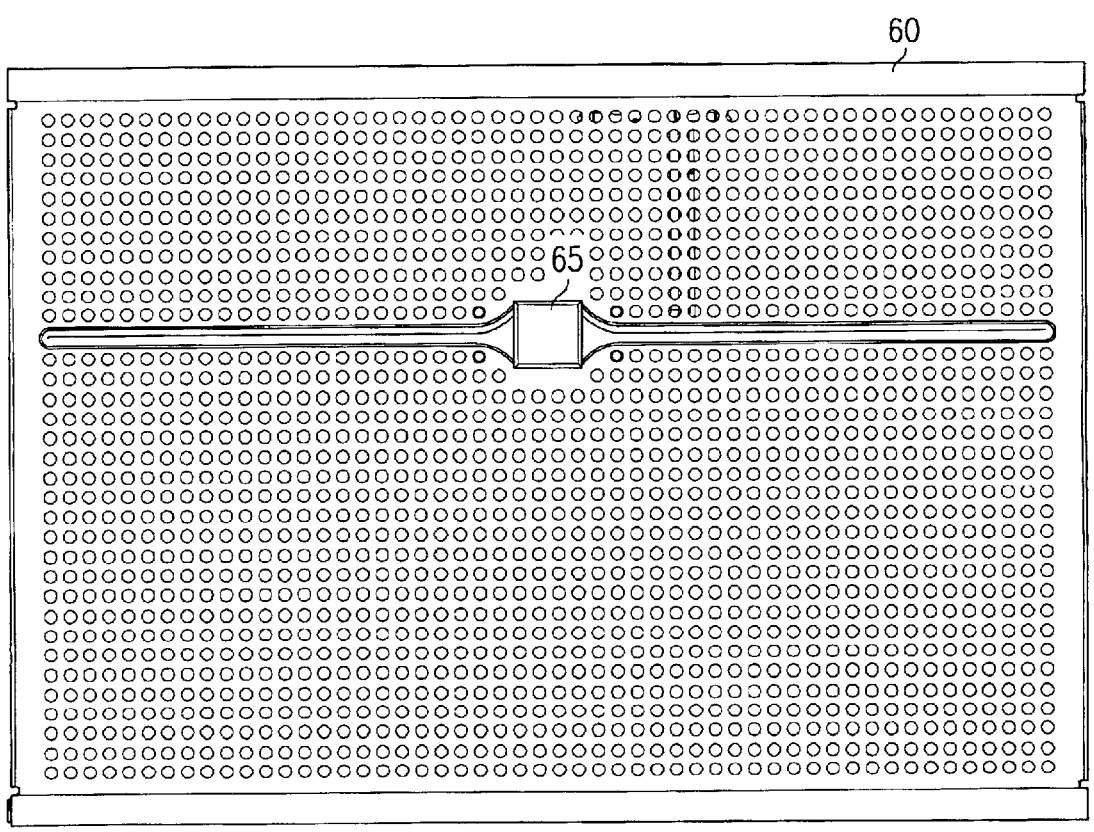
FIG. 2d is a front view of an embodiment of the bezel.

Primary status indicator 65 may be positioned in other locations on bezel 60. For example, as shown in FIG. 2c, primary status indicator 65 is located in the upper right hand corner of bezel 60. As discussed above, it is preferable for each primary status indicator 65 to be located in substantially the same position on the bezel 60 for each server 15 in the data center. Primary status indicator 65 can be any shape. For example, primary status indicator 65 may be a square-shaped indicator as shown in FIG. 2d. Because a uniform appearance will facilitate the visual location of a particular primary status indicator 65, its is also preferable for each primary status indicator 65 to be substantially the same size and shape for each server 15 in the data center. If computer system does not have bezel 60, then primary status indicator 65 may be mounted on front panel 55.

Figure 3A:
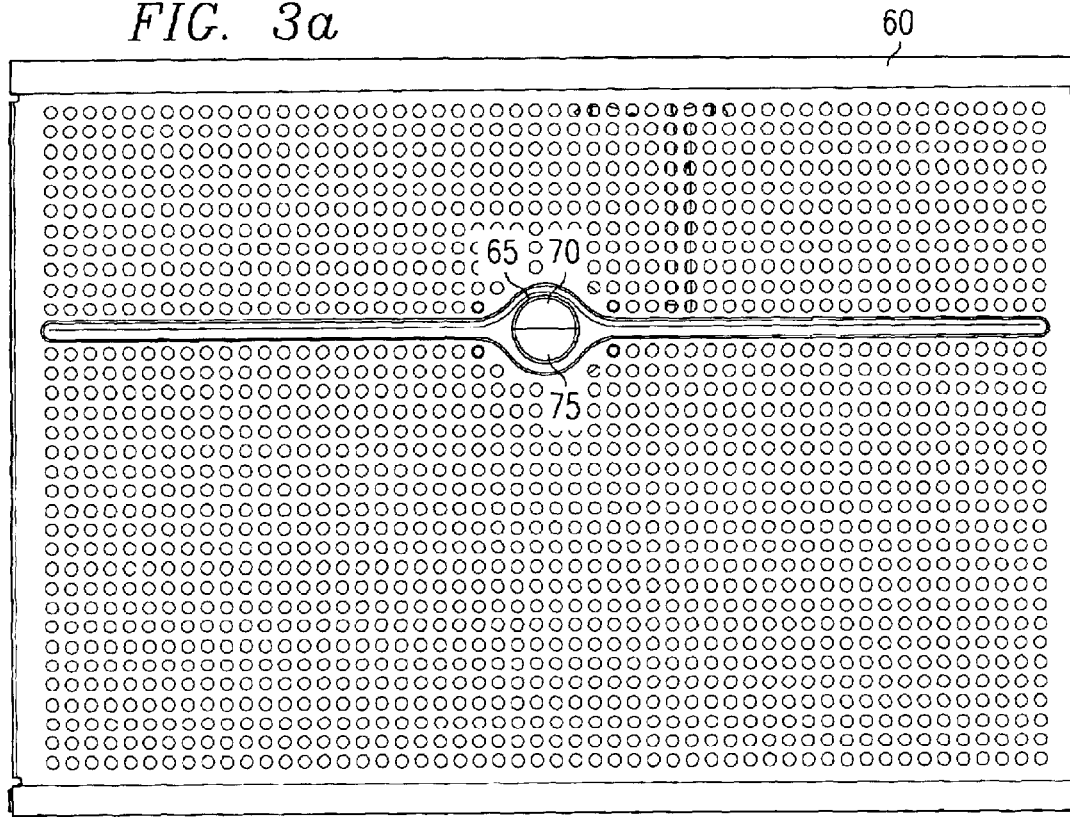
FIG. 3a is a front view of an embodiment of the bezel.
Figure 3B:
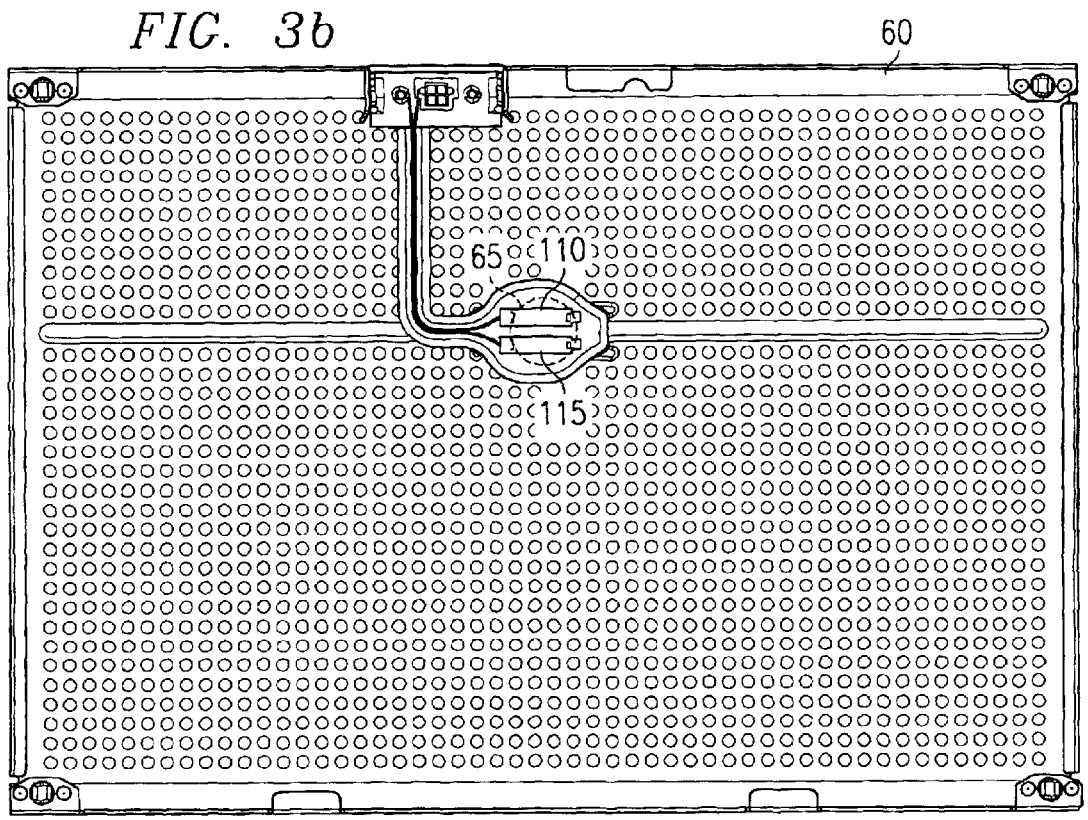
FIG. 3b is a back view of an embodiment of the bezel.

FIG. 3a is the front view of another embodiment of bezel 60. In this embodiment, primary status indicator 65 has two sections: a normal status section 70 and an alert status section 75. To facilitate faster recognition of the status of server 15, normal status section 70 is preferably located above alert status section 75. These two sections 70 and 75 need not be the same size. FIG. 3b shows the backside of bezel 60 shown in FIG. 3a. In this embodiment, primary status indicator 65 contains two light sources 110 and 115 for the illumination of primary status indicator 65. As discussed above, the light sources 110 and 115 may be any appropriate light source such as an LED or LED light bar. Light source 110 illuminates normal status section 70. Light source 110 may illuminate the normal status section 70 in any color or manner. Light source 110 is preferably illuminates normal status section 70 in a color generally associated with normal operating conditions or the corporate logo or trademark of the manufacturer or distributor of server 15. For example, light source 110 may illuminate normal status section 70 a blue or green color. Light source 115 is illuminates alert status section 75. Light source 115 may illuminate the alert status section 75 in any color or manner. Light source 115 is preferably illuminates alert status section 75 in a color generally associated with an alert status or a malfunction. For example, light source 115 may illuminate alert status section 75 an amber or a red color. Alternatively, both light sources 110 and 115, or a single light source, may produce only white light, and the normal and alert status sections 70 and 75 may be made of an appropriately colored transparent material. The specific colors discussed above are merely examples—the normal status section 70 and the alert status section 75 may be illuminated in any desired colors or manner.

Figure 3C:
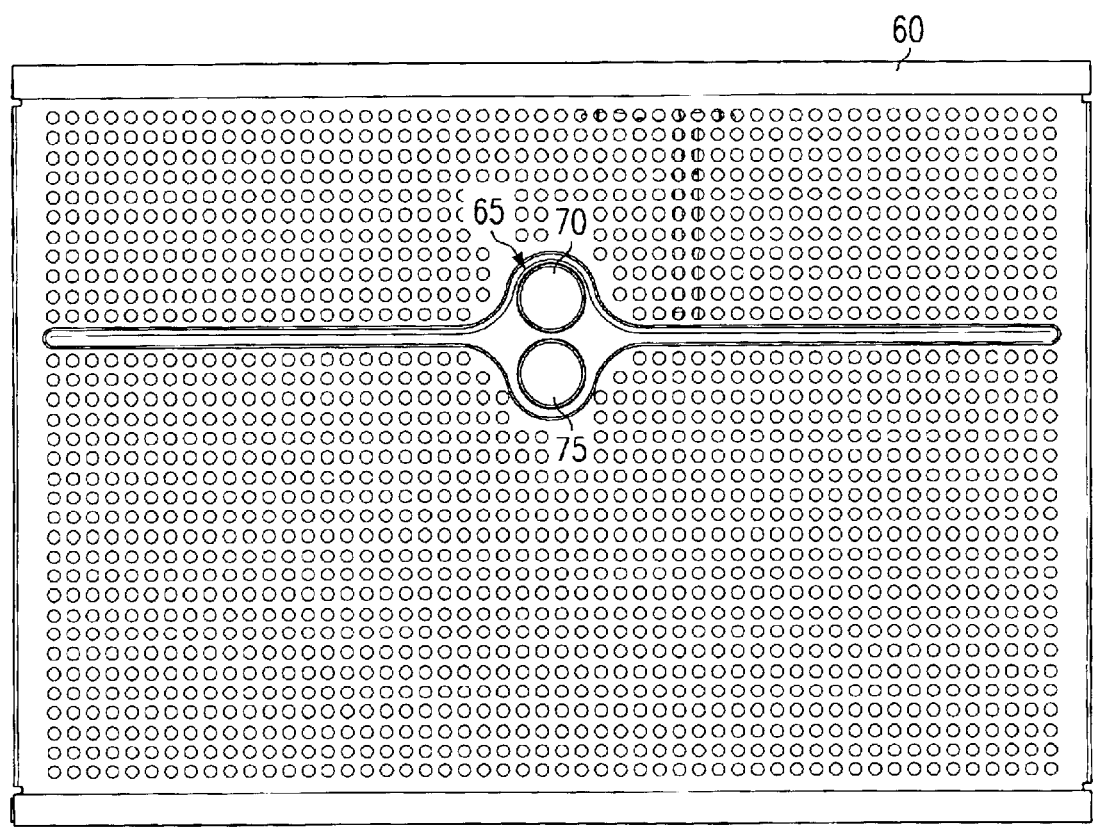
FIG. 3c is a front view of an embodiment of the bezel.

Primary status indicator 65 may have more than one or two sections, as shown in FIGS. 2a-d and 3a-b. The primary status indicator may utilize more sections to communicate additional status information for server 15. Furthermore, if primary status indicator 65 utilized two or more sections, these sections need not be presented as a single unit as shown in FIGS. 3a-b. For instance, primary status indicator 65 may be a cluster of status indicators or lights. In FIG. 3c, the normal status section 70 and the alert status section 75 of primary status indicator 65 are presented as a cluster of lights, rather than as a single or consolidated unit as shown in FIG. 3a.

Figure 5:
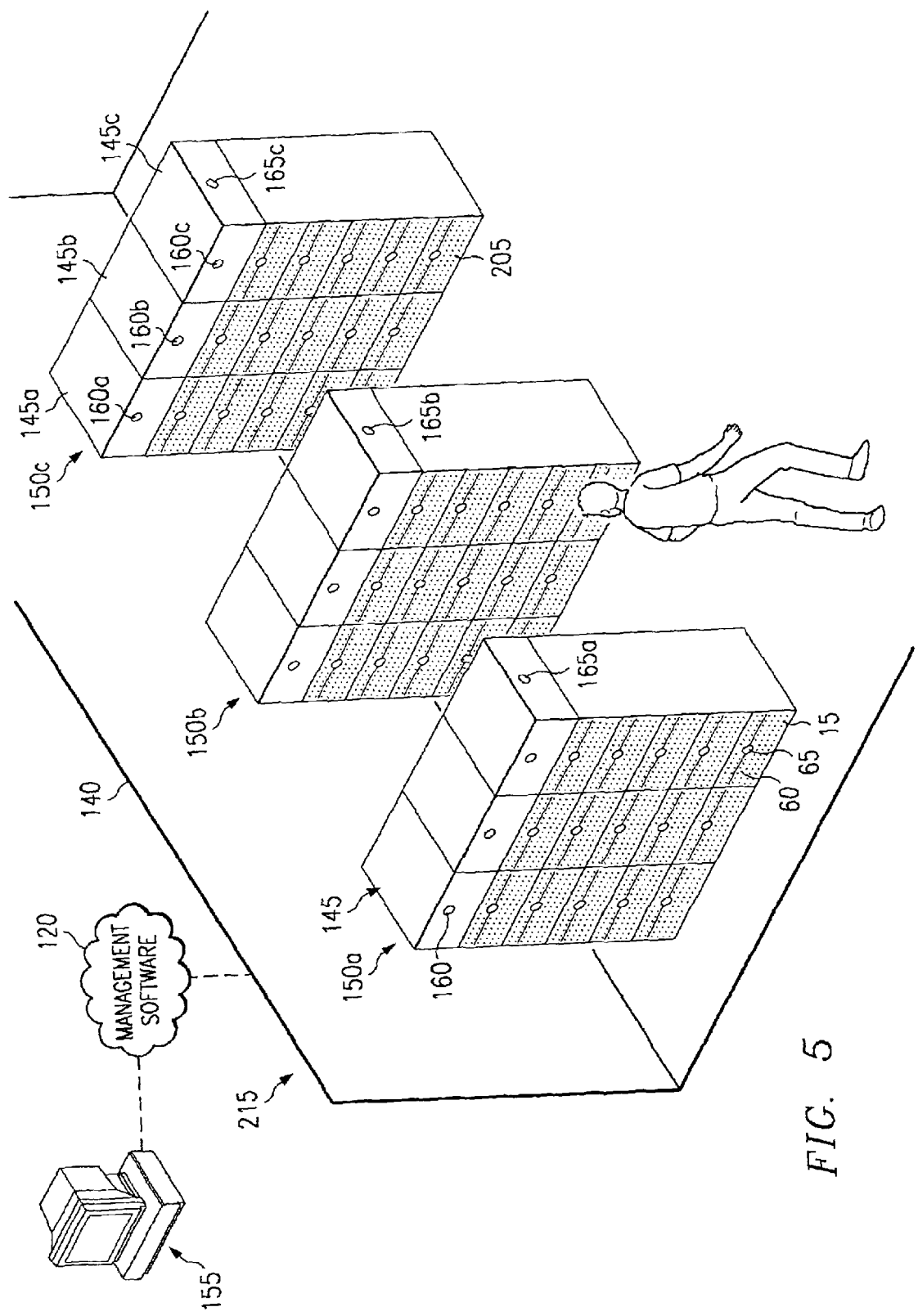
FIG. 5 is a pictorial view of a data center.

As shown in FIG. 5, a data center 140 may implement server management software 120. Primary status indicator 65 may receive status information from server management software 120. Primary status indicator 65 may be communicatively coupled to server management software 120 via a hardwired connection, such as a fiberoptic connection, a wireless connection such as one utilizing RF or IR transmission, or any other appropriate communications connection. Server management software 120 allows system managers to monitor the status of network components including servers 15. In general, server management software 120 evaluates the health or operating status of systems on the network and the components in those systems, monitor network performance, preempt network disruptions and identify areas for network growth and realignment. For example, server management software 120 may provide instrumentation to allow system administrators to gather status information such as temperature, fan speed, voltage and disk errors, and other data indicative of the health of servers 15. Accordingly, server management software 120 detects failed or failing network components and communicate this status information. Once a failed or failing network component has been detected, server management software 120 may illuminate the appropriate status lights associated with the failed or failing device and communicate an alert message or notice to the appropriate terminal or console. For example, in the event that server management software 120 detects a failing hard drive in the network, the appropriate hard drive alert status light will be illuminated and a notice will be communicated to monitoring console 155. Because primary status indicator 65 is communicatively coupled to server management software 120, primary status indicator 65 displays the status of server 15. If server management software 120 has not detected any failed or failing components in server 15, then the status of server 15 may be considered to be a normal operating status. If server management software 120 has detected any failed or failing components in server 15, then the status of server 15 may be considered to be an alert status. Depending on the status, primary status indicator 65 will be appropriately illuminated to reflect this status. Primary status indicator 65 may also receive status information directly from the server components or sensors associated with the server components.

Figure 4A:
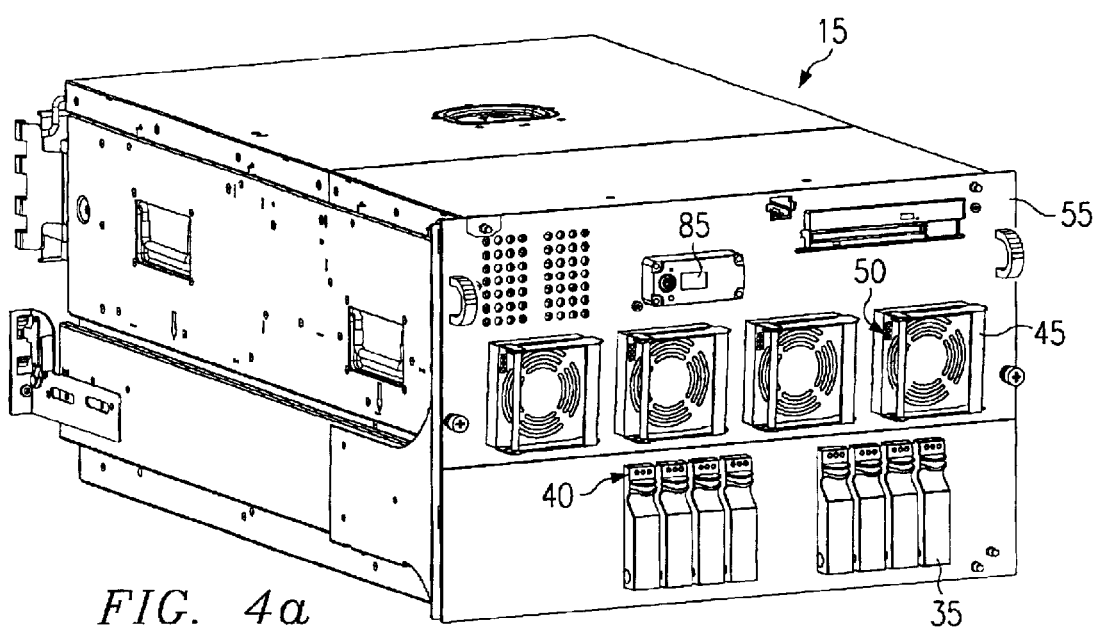
FIG. 4a is a pictorial view of a server with the bezel removed.

For the embodiment depicted in FIG. 2a, the primary status indicator 65 may be illuminated in a color generally associated with normal operation, such as green. Preferably, the primary status indicator 65 may be illuminated in a color associated with a corporate trademark, such as blue, for a normal operating status. In the event that a failed or failing device is detected in server 15, the primary status indicator 65 for that server 15 may be illuminated in a color generally associated with a malfunction such as red or amber. Alternatively, for normal status illumination or alert status illumination, primary status indicator 65 may be dimmed or cease to be illuminated. For example, when a failed or failing device is detected, the illumination state for primary status indicator 65 may be in a dimmed or off state. For the embodiment depicted in FIG. 3a, the normal status section 70 of primary status indicator 65 may remain illuminated as long as server management software 120 has not detected a failed or failing device in the server 15 associated with the primary status indicator 65. As discussed above, the normal status section 70 is preferably illuminated in a color associated with a corporate trademark or a color generally associated with a normal operating status. In the event that server management software 120 detects a failed or failing component in server 15, then the normal status section 70 ceases to be illuminated and alert status section 75 is illuminated. As discussed above, alert status section 75 is preferably illuminated in a color generally associated with a malfunction such as red or amber Status display 85 is preferably located on the front panel 55 of server 15. FIG. 4a shows an embodiment of status display 85, wherein the bezel 65 is not shown. Status display 85 is also communicatively coupled to server management software 120. Status display 85 may be any device that can display text or graphics. For example, status display 85 may be an LCD display. Status display 85 displays status information communicated from server management software 120. This status information may include normal operations such as a booting hard drive or information regarding failed or failing components. This status information may be displayed in text or the numeric code that is used by server management software 120 to report problems, or both. For example, in the event that the second fan for a server 15 is malfunctioning, status display 85 may display the text "FAN 2—FAIL." Status display 85 may show the error code that corresponds to a failure in the second fan. In the event that server management software 120 has nothing to report for server 15, then status display 85 may simply display the name or address of server 15.

Status display 85 may be illuminated in one or more colors. For instance, during normal operating status, status display may be illuminated in the selected color associated with a normal operating status, such as green or blue. Alternatively, during a normal operating status, status display 85 may not illuminated at all. In the event of a failed or failing component, status display 85 may be illuminated in the selected color associated with an alert status, such as red or amber.

Status display 85 may also be self-activating. For example, as shown in FIGS. 1a and 1b, bezel 60 may contain connector 125 to couple with dock 80 on the front panel of server 15. When bezel 60 is closed, connector 125 is coupled to dock 80. In the event that connector 125 is coupled to dock 80, status display 85 may be unilluminated. When bezel 60 is opened and connector 125 is uncoupled from dock 80, status display 85 may be illuminated. Accordingly, status display 85 may be illuminated only in the event bezel 60 is opened and therefore conserve energy and minimize the amount of light passing through bezel 65.

As discussed above, servers 15 may be organized in cabinets and several cabinets may be placed in a bank. If the faulty component that requires servicing cannot be accessed from the front of server 15, then the technician must walk behind the bank to open server 15 and replace the faulty component. If a status display 85 is only located on the front panel 55 of the server 15, the technician will not be able to read the information displayed on status display 85 if he is behind the bank. Accordingly, a status display 85 may also be located on the back panel 130 of server 15 as shown in FIG. 4b. Because the two status displays 85 receive status information from the same source, for example, the server management software 120, inconsistent status information may be avoided.

FIG. 5 illustrates a data center 140 implementing an embodiment of the present disclosure. Several servers 15 are mounted in cabinets 145. These servers 15 may be communicatively coupled to form one or more computer networks, generally indicated at 215. Several cabinets 145 are arranged into banks 150. A system administrator monitors the data center 140 through console 155 with server management software 120. In the event that server management software 120 registers a failing or failed component, a technician may be dispatched to data center 140. Instead of being overwhelmed with a multitude of server front panels 55 with numerous status lights, the technician is presented with a uniform array of bezel covers 60 with primary status indicators 65.

Primary status indicator 65 may also be associated with a group of servers 15 or a computer network rather than a single server 15. For example, in addition to being implemented on bezel 60 for server 15, a primary status indicator 65 may be implemented on cabinet housing 145 as a cabinet status indicator 160. A cabinet status indicator 160 is a primary status indicator that is associated with an entire cabinet 145 rather than a single server 15. Therefore, the cabinet status indicator 160 has substantially the same functionality and operates in the same manner as described above for the primary status indicator 65. When server management software detects a failing or failed component in a server 15, the cabinet status indicator 160 associated with the cabinet 145 that contains the affected server 15 will be appropriately illuminated to reflect the alert status. Thus, the cabinet status indicator 160 will reflect an alert status if any of the servers 15 located in that cabinet 145 require service. If server management software 120 reports that the status for all of the servers 15 mounted on that cabinet 145 is normal, then the cabinet status indicator 160 will accordingly reflect the normal operating status. The combination of primary status indicators 65 and cabinet status indicators 160 will enable the technician to respond to a service call much faster.

In addition to being implemented on a bezel 60 and cabinet housing 145, a primary status indicator may also be implemented for an entire bank 150 as a bank status indicator 165. Bank status indicator 165 is a primary status indicator that is associated with an entire bank 150 rather than a single server 15. Therefore, bank status indicator 165 has substantially the same functionality and operates in the same manner as described above for the primary status indicator 65. The bank status indicator 165 may be mounted on a selected cabinet housing 145, such as a cabinet 145 on the end of the bank 150. When server management software detects a failing or failed component in a server 15, the bank status indicator 165 associated with the bank 150 that contains the affected server 15 will be appropriately illuminated to reflect the alert status. Thus, the bank status indicator 165 will reflect an alert status if any of the servers 15 located in that bank 150 require service. If server management software 120 reports that the status for all of the servers 15 located in that bank 150 is normal, then the bank status indicator 165 will accordingly reflect the normal operating status. The combination of primary status indicators 65, cabinet status indicators 160 and bank status indicators 165 allows a technician to locate and replace or repair faulty components much faster.

FIG. 6 is a flow chart of the process of responding to a failed or failing server 15 with the present disclosure. At step 170, the server management software 120 detects a failing or failed component. For example, referring to FIG. 5, the failing component may be a hard drive for server 205 located in cabinet 145c of bank 150c. Next, at step 175, an alert message is communicated to the monitoring console 155. The alert status light for the failing hard drive is appropriately illuminated. The primary status indicator 65 associated with server 205 is also appropriately illuminated to reflect an alert status. If bank status indicators 165 are implemented in data center 140, then bank status indicator 165c is appropriately illuminated to reflect the alert status because server 205 is located in bank 150c. If cabinet status indicators 160 are implemented in data center 140, then cabinet status indicator 160c is appropriately illuminated to reflect the alert status because server 205 is located in cabinet 145c.

A technician is dispatched to data center 140 at step 180. The technician next locates the bank 150 and the cabinet 145 that contains the server with the failing or failed hard drive at step 185. The technician may quickly locate the bank 150 and cabinet 145 for server 205 by surveying the primary status indicators 65 as he passes by each bank 150. Because the primary status indicator 65 for server 205 will be properly illuminated to reflect the alert status, while every other primary status indicator 65 is illuminated to reflect a normal operating status, the technician will be able to find server 205 quickly. The technician may also quickly and easily locate the right bank 150 by first surveying the bank status indicators 165 and finding bank status indicator 165*c*. Because bank status indicator 165*c* is appropriately illuminated to reflect the alert status, the technician will be able to spot this indicator easily. Next, the technician may quickly and easily locate the right cabinet 145 by first surveying the cabinet status indicators 160 and finding bank status indicator 160*c*. Because cabinet status indicator 160*c* is appropriately illuminated to reflect the alert status, the technician will be able to spot this indicator easily.

Once the technician has located the proper bank 150*c* and cabinet 145*c*, he can easily locate server 205 by looking for the primary status indicator 65 that is illuminated to reflect an alert status at step 190. Next, at step 200, the technician removes or opens the bezel 60 for server 205 to view the front panel 55 of server 205. The technician may now view the status display 85 for server 205 and read the status message corresponding to server 205. If the hard drives for server 205 are mounted on the front, the technician may also view the status lights 40 for all of the hard drives 35 to locate the hard drive that has failed or is failing. The technician may now replace the faulty hard drive 35.

Because the primary status indicator 65 initially presents only one status indicator, the technician can quickly assess the status of several servers 15 without examining the front panel 55 of each server 15. Thus, a server 15 with a failing component can be quickly identified out of a large group of servers 15. The primary status indicator 65 also provides an unambiguous indication of the status of a server 15. A technician can quickly determine whether a server component has failed based on the color and/or position of the illumination of the primary status indicator 65. Implementing the primary status indicator 65 allows for a uniform positioning of status information across all servers 15 in a data center 140 regardless of server configuration and manufacturer. Because only one primary status indicator 65 needs to be positioned on a bezel 60, the primary status indicators 65 may be uniformly positioned on all of the bezels 60. The uniform location of the primary status indicator 65 also facilitates a fast assessment of server status. The primary status indicator 65 may be used on servers 15 with small or narrow front panels 55, because the primary status indicator 65 is only a single indicator, and it may also incorporate a logo or mark that might otherwise take up limited space. Furthermore, because a corporate mark may be incorporated into the primary status indicator 65, positive trademark recognition may be reinforced during normal status conditions. The primary status indicator 65 also allows for a uniform design throughout the data center 140 regardless of server configuration or manufacturer, which also reinforces trademark recognition.

Although the disclosed embodiments have been described in detail, it should be understood that various changes, substitutions, and alterations can be made to the embodiments without departing from the spirit and the scope of the invention.

What is claimed is:

1. A computer system that includes multiple computer components, comprising:
    a housing;
    a bezel;
    management software operable to monitor the multiple computer components of the computer system and to determine if one or more of the multiple computer components is failing or has failed; and
    a primary status indicator positioned on an outer surface of the bezel, wherein the primary status indicator is operable to be illuminated in a first state if no computer components of the computer system are failing or have failed, and wherein the primary status indicator is operable to be illuminated in a second state if any one of the computer components of the computer system is failing or has failed.

2. The computer system of claim 1,
    further comprising a front panel; and
    wherein the bezel is mounted to substantially cover the front panel.

3. The computer system of claim 1, wherein the primary status indicator is illuminated in the color blue for the first state.

4. The computer system of claim 1, wherein the primary status indicator is illuminated in an off state for the first state.

5. The computer system of claim 1, wherein the primary status indicator is illuminated in an off state for the second state.

6. The computer system of claim 1,
    wherein the primary status indicator comprises,
    a normal status section; and
    an alert status section.

7. The computer system of claim 6, wherein the normal status section and alert status section are presented as a cluster.

8. The computer system of claim 6,
    wherein the normal status section is operable to be illuminated if no components are failing or have failed; and
    wherein the alert status indicator is operable to be illuminated if a component is failing or has failed.

9. The computer system of claim 8, wherein the normal status section is operable to be illuminated in the color blue.

10. The computer system of claim 8, wherein the normal status section displays a corporate logo.

11. The computer system of claim 1, wherein the primary status indicator is cycloptically positioned on the bezel.

12. The computer system of claim 1, wherein the primary status indicator is operable to rotate to remain level.

13. A cabinet operable to contain a plurality of computer systems, wherein each of the computer systems is coupled to multiple computer components and wherein each of the computer systems includes management software operable to monitor the multiple computer components of the computer system and to determine if one or more of the multiple computer components is failing or has failed, comprising:
    an outer surface; and
    a primary status indicator located on the outer surface, wherein the primary status indicator is operable to be illuminated in a first state if no components of the computer systems of the cabinet are failing or have failed, and wherein the primary status indicator is operable to be illuminated in a second state if any one of the computer components of the computer systems of the cabinet are failing or have failed.

14. The cabinet of claim 13, wherein the primary status indicator is illuminated blue for the first state.

15. The cabinet of claim 13, wherein the primary status indicator is illuminated in an off state for the first state.

16. The cabinet of claim 13, wherein the primary status indicator is illuminated in an off state for the second state.

17. The cabinet of claim 13,
wherein primary status indicator comprises
a normal status section; and
an alert status section.

18. The cabinet of claim 17, wherein the normal status section and alert status section are presented as a cluster.

19. The cabinet of claim 17,
wherein the normal status section is operable to be illuminated if no components are failing or have failed; and
wherein the alert status indicator is operable to be illuminated if a component is failing or has failed.

20. The cabinet of claim 19, wherein the normal status indicator is illuminated blue if no components are failing or have failed.

21. The cabinet of claim 17, wherein the normal status section displays a corporate logo.

22. The cabinet of claim 17, wherein the primary status indicator is cycloptically located on the outer surface.

23. The cabinet of claim 17, further comprising a second primary status indicator operable to be communicatively coupled to a server management software operable to monitor multiple computer components of one or more computer systems contained in at least one other cabinet.

24. A primary status indicator operable to be communicatively coupled to server management software operable to monitor multiple computer components of a computer system and determine whether a component is failing or has failed,
wherein the primary status indicator is operable to be illuminated in a first state if no computer components are failing or have failed, and
wherein the primary status indicator is operable to be illuminated in a second state if any one of the computer components is failing or has failed.

25. The primary status indicator of claim 24,
wherein the primary status indicator is operable to be mounted on a bezel, wherein the bezel is operable to be mounted to substantially cover a front panel of the computer system.

26. The primary status indicator of claim 25, wherein the primary status indicator is cycloptically positioned on the bezel.

27. The primary status indicator of claim 25, wherein the primary status indicator remains level with reference to the horizon despite the orientation of the computer system.

28. The primary status indicator of claim 24, wherein the primary status indicator is operable to be illuminated in the color blue.

29. The primary status indicator of claim 24, wherein the primary status indicator is operable to be illuminated in the off state for the first state.

30. The primary status indicator of claim 24, wherein the primary status indictor is operable to be illuminated in the off state for the second state.

31. The primary status indicator of claim 24, further comprising
a normal status section; and
an alert status section.

32. The primary status indicator of claim 31, wherein the sections are presented as a cluster.

33. The primary status indicator of claim 31,
wherein the normal status section is operable to be illuminated if no components are failing or have failed; and
wherein the alert status indicator is operable to be illuminated if a component is failing or has failed.

34. The primary status indicator of claim 33, wherein the normal status section is operable to be illuminated in the color blue.

35. The primary status indicator of claim 31, wherein the normal status section displays a corporate logo.

36. A method for displaying status information for a computer system, wherein the computer system includes multiple computer components, and wherein the computer system includes a primary status indicator communicatively coupled to a server management software to monitor the computer components and determine whether a component is failing or has failed, the method comprising the steps of:
illuminating the primary status indicator in a first state if no computer components are failing or have failed; and
illuminating the primary status indicator in a second state if any one of the computer components is failing or has failed.

37. The method for displaying status information of claim 36, wherein the primary status indicator is illuminated in the color blue for the first state.

38. The method for displaying status information of claim 36, wherein the primary status indicator is illuminated in an off state for the first state.

39. The method for displaying status information of claim 36, wherein the primary status indicator is illuminated in an off state for the second state.

40. The method for displaying status information of claim 36, wherein the primary status indicator is mounted on a bezel, wherein the bezel is mounted to substantially cover a front panel of the computer system.

41. The method for displaying status information of claim 40, wherein the primary status indicator is cycloptically positioned on the bezel.

42. The method for displaying status information of claim 36, wherein the primary status further comprises
a normal status section; and
an alert status section.

43. The method for displaying status information of claim 42, wherein the step of illuminating the primary status indicator in a first state further comprises the step of illuminating the normal status section.

44. The method for displaying status information of claim 42, wherein the step of illuminating the primary status indicator in a second state further comprises the step of illuminating the alert status section.

45. The method for displaying status information of claim 42, wherein the normal status section displays a corporate logo.

46. A method for displaying status information for a group of computer systems, wherein each computer system comprises multiple computer components, comprising the steps of:
providing a primary status indicator communicatively coupled to server management software to monitor the computer components of each computer system and determine whether a computer component is failing or has failed;
illuminating the primary status indicator in a first state if no computer components are failing or have failed; and
illuminating the primary status indicator in a second state if any one computer component of any computer system is failing or has failed.

47. The method of claim 46, wherein the primary status indicator is illuminated in the color blue in a first state.

48. The method of claim 46, wherein the primary status indicator is illuminated in an off state for the first state.

49. The method of claim 46, wherein the primary status indicator is illuminated in an off state for the second state.

50. The method of claim 46, wherein the group of computer systems are mounted in a cabinet.

51. The method of claim 46, wherein the group of computer systems are mounted in a plurality of cabinets that are organized into a bank.

52. The method of claim 46, wherein the primary status further comprises a normal status section; and an alert status section.

53. The method of claim 52, wherein the step of illuminating the primary status indicator in a first state further comprises the step of illuminating the normal status section.

54. The method of claim 52, wherein the step of illuminating the primary status indicator in a second state further comprises the step of illuminating the alert status section.

55. The method of claim 52, wherein the normal status section displays a corporate logo.

56. A computer system that includes multiple computer components comprising:

a housing;

server management software for monitoring the computer components, wherein the server management software is operable to determine if any one of the computer components is failing or has failed; and a primary status indicator positioned on an outer surface of the housing, wherein the primary status indicator is communicatively coupled to server management software, wherein the primary status indicator is operable to be illuminated in a first state if no computer components are failing or have failed, and wherein the primary status indicator is operable to be illuminated in a second state if any one of the computer components is failing or has failed.

57. The computer system of claim 56, further comprising a front panel; and wherein the primary status indicator positioned on the front panel.

58. The computer system of claim 57, wherein the primary status indicator is cycloptically positioned on the front panel.

59. The computer system of claim 56, wherein the primary status indicator is illuminated in the color blue for the first state.

60. The computer system of claim 56, wherein the primary status indicator is illuminated in an off state for the first state.

61. The computer system of claim 56, wherein the primary status indicator is illuminated in an off state for the second state.

62. The computer system of claim 56, wherein the primary status indicator comprises, a normal status section; and an alert status section.

63. The computer system of claim 62, wherein the normal status section and alert status section are presented as a cluster.

64. The computer system of claim 62, wherein the normal status section is operable to be illuminated if no components are failing or have failed; and wherein the alert status indicator is operable to be illuminated if a component is failing or has failed.

65. The computer system of claim 64, wherein the normal status section is operable to be illuminated in the color blue.

66. The computer system of claim 64, wherein the normal status section displays a corporate logo.

67. The computer system of claim 56, wherein the primary status indicator is operable to rotate to remain level.

* * * * *